(12) United States Patent
Fay et al.

(10) Patent No.: US 9,148,676 B2
(45) Date of Patent: Sep. 29, 2015

(54) BROADCAST TRANSITION CHANNEL

(71) Applicant: Sony Corporation, Tokyo (JP)

(72) Inventors: Luke Fay, San Diego, CA (US); Lachlan Michael, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/963,138

(22) Filed: Aug. 9, 2013

(65) Prior Publication Data

US 2014/0157304 A1 Jun. 5, 2014

Related U.S. Application Data

(60) Provisional application No. 61/733,242, filed on Dec. 4, 2012.

(51) Int. Cl.
| | |
|---|---|
| *H04N 7/173* | (2011.01) |
| *H04N 7/16* | (2011.01) |
| *H04N 21/234* | (2011.01) |
| *H04N 21/2385* | (2011.01) |

(52) U.S. Cl.
CPC ..... *H04N 21/23424* (2013.01); *H04N 21/2385* (2013.01)

(58) Field of Classification Search
CPC ...... H04N 5/4401; H04N 21/235; H04N 7/10
USPC ......................................... 725/118, 138, 148
See application file for complete search history.

(56) References Cited

U.S. PATENT DOCUMENTS

| | | | | |
|---|---|---|---|---|
| 6,295,148 | B1 * | 9/2001 | Atlas ................................. | 398/9 |
| 6,871,188 | B2 * | 3/2005 | De Souza ..................... | 705/26.8 |
| 7,015,948 | B2 * | 3/2006 | Skalina ......................... | 348/180 |
| 7,665,106 | B2 * | 2/2010 | Kim et al. ........................ | 725/33 |
| 7,716,711 | B1 * | 5/2010 | Weinstein et al. ............ | 725/118 |
| 7,940,337 | B2 * | 5/2011 | Goyal et al. ................... | 348/725 |
| 8,006,268 | B2 * | 8/2011 | Sloo ................................ | 725/53 |
| 8,200,243 | B1 * | 6/2012 | Feher ........................ | 455/456.1 |
| 2009/0253456 | A1 | 10/2009 | Toh et al. | |
| 2009/0280808 | A1 * | 11/2009 | You et al. ................... | 455/435.2 |
| 2011/0075990 | A1 | 3/2011 | Eyer | |
| 2011/0088075 | A1 | 4/2011 | Eyer | |
| 2011/0243536 | A1 | 10/2011 | Eyer | |
| 2011/0246488 | A1 | 10/2011 | Eyer | |
| 2011/0247028 | A1 | 10/2011 | Eyer | |

(Continued)

OTHER PUBLICATIONS

U.S. Appl. No. 13/559,188, filed Jul. 26, 2012, Kitazato.

(Continued)

*Primary Examiner* — Nathan Flynn
*Assistant Examiner* — Sumaiya A Chowdhury
(74) *Attorney, Agent, or Firm* — Oblon, McClelland, Maier & Neustadt, L.L.P.

(57) ABSTRACT

A distribution system and reception apparatus, and methods thereof, are provided for broadcasting and receiving a plurality of first services from a plurality of different broadcast providers, which broadcast a plurality of second services over a plurality of different broadcast channels, on a transition broadcast channel that is different from the plurality of different broadcast channels. The system includes at least one receiver and a transmitter. The at least one receiver is configured to receive the plurality of first services from the plurality of different broadcast providers. The transmitter is configured to broadcast the plurality of first services over the transition broadcast channel.

28 Claims, 10 Drawing Sheets

(56) References Cited

U.S. PATENT DOCUMENTS

| | | |
|---|---|---|
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1 | 1/2013 | Eyer |
| 2013/0024897 A1 | 1/2013 | Eyer |
| 2013/0031569 A1 | 1/2013 | Kitazato et al. |
| 2013/0036440 A1 | 2/2013 | Eyer |
| 2013/0055313 A1 | 2/2013 | Eyer |
| 2013/0103716 A1 | 4/2013 | Yamagishi |
| 2013/0145414 A1 | 6/2013 | Yamagishi |
| 2013/0167171 A1 | 6/2013 | Kitazato et al. |
| 2013/0191860 A1 | 7/2013 | Kitazato et al. |

OTHER PUBLICATIONS

U.S. Appl. No. 13/587,975, filed Aug. 17, 2012, Kitazato.
U.S. Appl. No. 13/593,554, filed Aug. 24, 2012, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, Eyer.
U.S. Appl. No. 13/927,667, filed Jun. 26, 2013, Yamagishi.
U.S. Appl. No. 13/934,581, filed Jul. 3, 2013, Eyer.
U.S. Appl. No. 13/934,549, filed Jul. 3, 2013, Fay et al.
U.S. Appl. No. 13/934,615, filed Jul. 3, 2013, Eyer.
U.S. Appl. No. 13/934,924, filed Jul. 3, 2013, Yamagishi.
U.S. Appl. No. 13/934,473, filed Jul. 3, 2013, Yamagishi.
U.S. Appl. No. 13/955,130, filed Jul. 31, 2013, Fay.
International Search Report and Written Opinion of the International Searching Authority issued Mar. 13, 2014, in PCT/US13/66384, filed Oct. 23, 2013.

* cited by examiner

BROADCAST TRANSITION CHANNEL

CROSS-REFERENCE TO RELATED APPLICATIONS

This application claims the benefit of priority to U.S. provisional application No. 61/733,242, filed Dec. 4, 2012, the entire contents of which is incorporated herein by reference in its entirety.

BACKGROUND OF THE INVENTION

1. Field of the Invention

Embodiments described herein relate generally to broadcast services. More particularly, embodiments described herein relate generally to transitioning to broadcasting services that are not backwards compatible.

2. Background

Modern televisions and set top boxes are capable of receiving broadcast television services. However, due to limitations in wireless spectrum availability, broadcast television service providers may not have sufficient spectrum to provide new services that are not backwards compatible while maintaining the availability of existing services.

SUMMARY OF THE INVENTION

According to an embodiment of the present disclosure, there is provided a distribution system configured to broadcast a plurality of first services from a plurality of different broadcast providers, which broadcast a plurality of second services over a plurality of different broadcast channels, on a transition broadcast channel that is different from the plurality of different broadcast channels. The system includes at least one receiver and a transmitter. The at least one receiver is configured to receive the plurality of first services from the plurality of different broadcast providers. The transmitter is configured to broadcast the plurality of first services over the transition broadcast channel.

According to an embodiment of the present disclosure, there is provided a reception apparatus configured to receive a plurality of first services from a plurality of different broadcast providers, which broadcast a plurality of second services over a plurality of different broadcast channels, on a transition broadcast channel that is different from the plurality of different broadcast channels. The reception apparatus includes an input interface, a tuner, a decoder, and a display interface. The input interface is configured to receive a selection of one of the plurality of first services broadcast via the transition broadcast channel. The tuner is configured to tune to the transition broadcast channel. The decoder is configured to decode the selected one of the plurality of first services on the tuned transition broadcast channel. The display interface is configured to output the selected one of the plurality of first services on the transition broadcast channel for display.

According to an embodiment of the present disclosure, there is provided a method of a distribution system configured to broadcast a plurality of first services from a plurality of different broadcast providers, which broadcast a plurality of second services over a plurality of different broadcast channels, on a transition broadcast channel that is different from the plurality of different broadcast channels. The method includes receiving, by at least one receiver, the plurality of first services from the plurality of different broadcast providers. A transmitter broadcasts the plurality of first services over the transition broadcast channel.

According to an embodiment of the present disclosure, there is provided a method of a reception apparatus configured to receive a plurality of first services from a plurality of different broadcast providers, which broadcast a plurality of second services over a plurality of different broadcast channels, on a transition broadcast channel that is different from the plurality of different broadcast channels. The method includes receiving, by an input interface, a selection of one of the plurality of first services broadcast via the transition broadcast channel. A tuner tunes to the transition broadcast channel. A decoder decodes the selected one of the plurality of first services on the tuned transition broadcast channel. Further, the selected one of the plurality of first services on the transition broadcast channel is output by a display interface for display.

Further, there is provided at least one non-transitory computer-readable storage medium having instructions embedded therein, which, when executed by at least one computer, causes the at least one computer to perform the methods of the distribution system and/or the reception apparatus discussed above.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
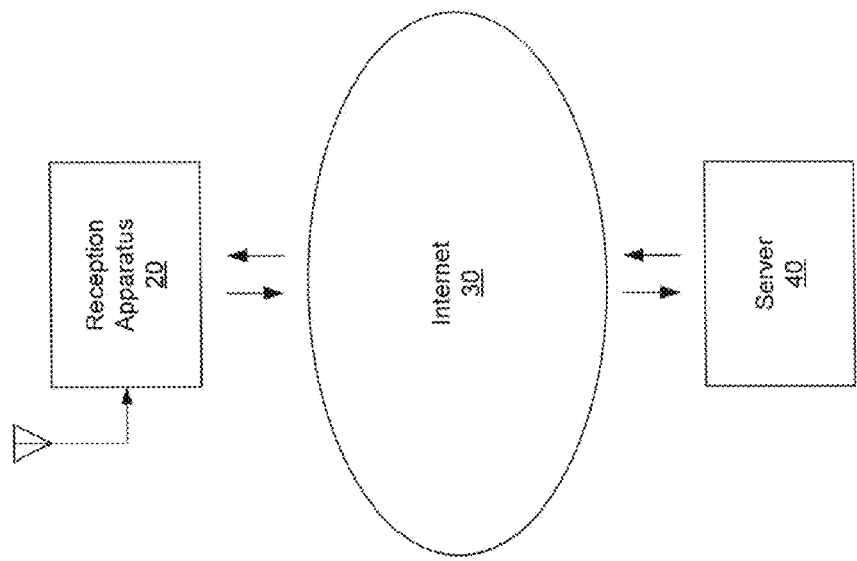
FIG. 1 illustrates an exemplary broadcast system.
Figure 1:
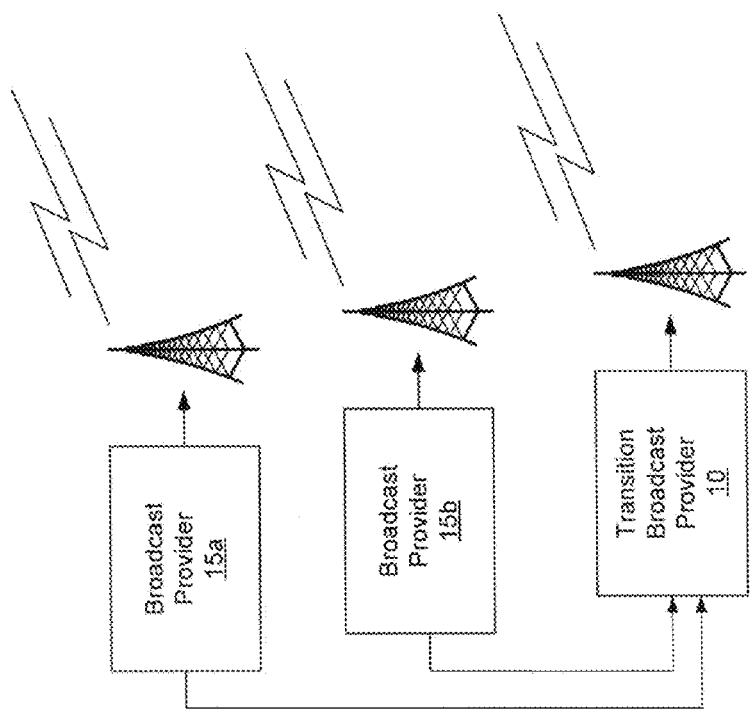

While the present disclosure is susceptible of embodiment in many different forms, there is shown in the drawings and will herein be described in detail specific embodiments, with the understanding that the disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system. The term "non-transitory", as used herein, is a limitation of the medium itself (i.e., tangible, not a signal) as opposed to a limitation on data storage persistency (e.g., RAM vs. ROM).

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Embodiments of the disclosure are directed to transitioning from existing services to new services such as next generation broadcast television (NGBT) services. For example, some embodiments of the disclosure are directed to transitioning to a NGBT service that is not compatible with existing terrestrial broadcast services. In the case of a non-backwards-compatible system, in one embodiment, the new NGBT service provides improvements in performance, functionality, and/or efficiency to facilitate its implementation. The new NGBT service provides new services such as mobile television, ultra-high-definition television (UHDTV) services, new audio and video codecs, more robust and/or efficient transmission methods, more operational modes, broadcaster control parameters, consumer control parameters, interactivity, etc.

FIG. 1 illustrates an exemplary terrestrial broadcast system 2 for providing a plurality of first (e.g., NGBT) and second (e.g., existing broadcast) services. The terrestrial broadcast system 2 includes a transition broadcast provider 10; broadcast providers 15a, 15b; a reception apparatus 20; and a server 40. Although FIG. 1 illustrates one transition broadcast provider 10; two broadcast providers 15a, 15b; one reception apparatus 20; and one server 40, it should be understood that any number of each may be included in the broadcast system 2.

The transition broadcast provider 10 broadcasts a plurality of first services from a plurality of different broadcast providers 15a, 15b on a transition broadcast channel. The plurality of different broadcast providers 15a, 15b broadcast a plurality of second services on a plurality of different broadcast channels. For example, each of the transition broadcast provider 10 and the broadcast providers 15a, 15b broadcast respective services using a broadcast tower via a studio to transmitter link (STL).

In one embodiment, the first and second services provided by the transition broadcast provider 10 and broadcast providers 15a, 15b, respectively, are television broadcast services that include one or more television content, without regard to whether the content is a movie, sporting event, segment of a multi-part series, news broadcast, etc. Further, the first and second services may also include advertisements, infomercials, and other program-like content which may not be reported as a program in an EPG.

The plurality of first services are broadcast using a first transmission scheme such as orthogonal frequency-division multiplexing (OFDM) and the plurality of second services are broadcast using a second transmission scheme such as 8-level vestigial sideband modulation (8-VSB). However, any other combination of incompatible transmission schemes (i.e., not capable of simultaneous broadcast on the same broadcast channel) may be used to transmit the plurality of first and second services. In one embodiment, the broadcast providers 15a, 15b broadcast digital television signals in accordance with standards set, for example, by the Advanced Television Systems Committee (ATSC) such as ATSC standard A/53, which is incorporated herein by reference in its entirety.

Further, although the broadcast providers 15a, 15b and the transition broadcast provider 10 are illustrated as each being associated with a separate broadcast tower, contractual agreements may be made between any two or more of the broadcast providers 15a, 15b and the transition broadcast provider 10. For example, broadcast provider 15a may enter into a contractual agreement with broadcast provider 15b such that the broadcast provider 15b uses the same broadcast tower to provide its own at least one second service on its broadcast channel and the plurality of first services on the transition broadcast channel.

In one embodiment, the transition broadcast provider 10 and broadcast providers 15a, 15b provide the plurality of first and second services via terrestrial broadcasts. In the case of audio/video content, the content is compressed and broadcast using different transmission schemes, as discussed above. For example, the audio/video content of the plurality of first and second services is divided into a video elementary stream (ES) and an audio ES corresponding to the video and audio portions of the content. The video ES and audio ES are multiplexed with other data to form a broadcast multiplex, such as an MPEG-2 Transport Stream (TS), MPEG Media Transport (MMT) or similar technology in the case of the broadcast by the broadcast providers 15a, 15b. Further, in one embodiment, the transition broadcast channel carries a transport (e.g., an MMT) or IP packets, which is different than that broadcast by the broadcast providers 15a, 15b.

The reception apparatus 20 is configured to receive the plurality of first services broadcast by the transition broadcast provider 10. The reception apparatus 20 may optionally be configured to receive the plurality of second services broadcast by the broadcast provider 15a, 15b or services from other sources. The plurality of second services are also provided to consumer devices that are not configured to receive the plurality of first services (e.g., a television with a ATSC A/53 receiver).

The reception apparatus 20 may be a mobile or fixed device. In one embodiment, the reception apparatus 20 is a mobile device such as a cellular phone, tablet, smart phone, portable computer, etc. due to the shorter upgrade cycles of these devices. However, fixed devices such as televisions and set top boxes may also be configured to receive the plurality of first services.

The reception apparatus 20 is configured to connect to the Internet 30 via a wireless or fixed connection. For example, when the reception apparatus 20 is a mobile device, the reception apparatus 20 connects to the Internet 30 via a mobile data connection or Wi-Fi connection. When the reception apparatus 20 is a fixed device, the reception apparatus 20 connects via an Ethernet connection, wireless connection, mobile data connection, etc.

In one embodiment, the reception apparatus 20 connects to the Internet 30 to receive or send information based on one of the plurality of first services broadcast by the transition broadcast provider 10. For example, the reception apparatus 20 may make a purchase for advertised goods, contents, or services via the Internet 30, request additional information related to the one of the plurality of first services, interface to a social network website based on instructions accompanying the one of the plurality of first services, etc. The reception apparatus 20, in one embodiment, receives the information associated with the one of the plurality of first services from at least one server 40. In other embodiments, the server 40 may be provided by the transition broadcast provider 10 or each separate broadcast provider 15a, 15b may provide its own server 40.

Figure 2:
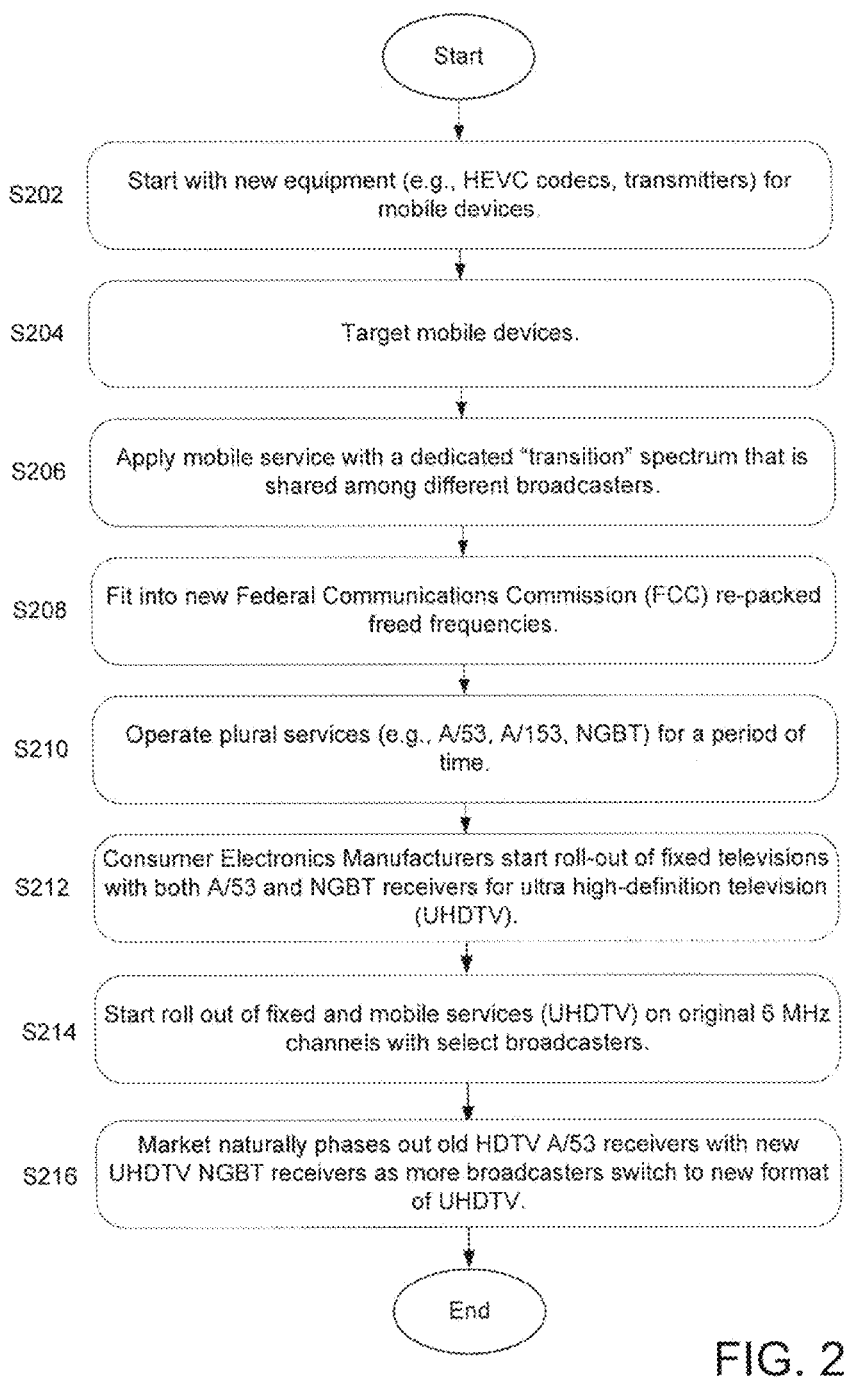
FIG. 2 illustrates an exemplary transition methodology.

FIG. 2 illustrates an exemplary transition plan for transitioning to a NGBT service that is not backwards compatible with one or more existing terrestrial broadcast services. In step S202, new equipment, including hardware and/or software components, are developed for mobile devices. Although FIG. 2 is described with respect to mobile devices, the transition plan is also applicable to fixed devices. In step S204, consumer electronics manufacturers target the mobile devices by rolling out new mobile devices (e.g., cellular phones, smart phones, tablets, portable computers, etc.) with the newly developed hardware and/or software components (e.g., a receiver that can receive NGBT services). Mobile devices are targeted in step S204 because consumers have a tendency to phase out mobile devices in a shorter amount of time (e.g., 2-3 years). However, any other consumer devices, including fixed devices, (e.g., laptop computers, televisions, etc.) may be targeted by the consumer electronics manufacturers.

In step S206, the NGBT services are applied to a dedicated "transition" 6 MHz spectrum. However, any other spectrum size may be implemented, such as a spectrum that is a multiple of 6 MHz, based on spectrum availability. In one embodiment, the NGBT services broadcast in the 6 MHz spectrum is a high-definition mobile service that is also receivable by fixed devices, with appropriate hardware/software.

In one embodiment, the transition broadcast channel is within the ultra high frequency (UHF) band in a range of 470 MHz to 698 MHz to offer better reception by mobile devices. In another embodiment, the transition broadcast channel is within a range of 470 MHz to 578 MHz based on possible reallocation of broadcast spectrum to wireless broadband services. In a further embodiment, the transition broadcast channel is placed adjacent to a channel used for another purpose (e.g., wireless broadband), or between a television broadcast channel and the channel used for another purpose, to reduce interference effects by, for example, broadcasting the NGBT services at a power lower than existing broadcast services. For example, the transition broadcast channel may be a 6 MHz channel from 578 to 584 MHz (i.e., channel 32) or 698 to 704 MHz (i.e., channel 52).

In other embodiments, the transition broadcast channel is allocated within the very high frequency (VHF) band in a range of 54-88 MHz and/or 174-216 MHz. The VHF band is used for the transition broadcast channel to, for example, allow the broadcast providers to perform the hard switch in the UHF band, which allows for better signal penetration.

In step S208, the NGBT services are fit into, and broadcast on, new Federal Communications Commission (FCC) re-packed freed frequencies. In one embodiment, step S208 requires requesting the FCC to save at least one broadcast channel in the repack for use as a transition broadcast channel.

In step S210, the broadcast providers provide the NGBT and existing terrestrial broadcast services such as services according to the Advanced Television Systems Committee (ATSC) A/53 and A/153 standards, which are incorporated herein by reference.

Subsequently, in step S212, the consumer electronics manufacturers start roll-out of fixed televisions with both ATSC A/53 and NGBT receivers for new services such as UHDTV. The fixed televisions are configured to determine whether NGBT or existing terrestrial broadcast services are being provided on a channel by channel basis.

In step S214. select broadcast providers start roll out of the NGBT services such as fixed and mobile services (e.g., UHDTV) on the original 6 MHz channels used to provide the existing television broadcast services. In one embodiment, this roll out would be a hard switch determined by each individual broadcast provider. Time will be needed to allow market forces to work on the broadcast providers for the transition.

In step S216, the market naturally phases out the ATSC A/53 receivers with new NGBT receivers as more service providers switch to NGBT services such as UHDTV.

Figures 3A, 3B, 3C:
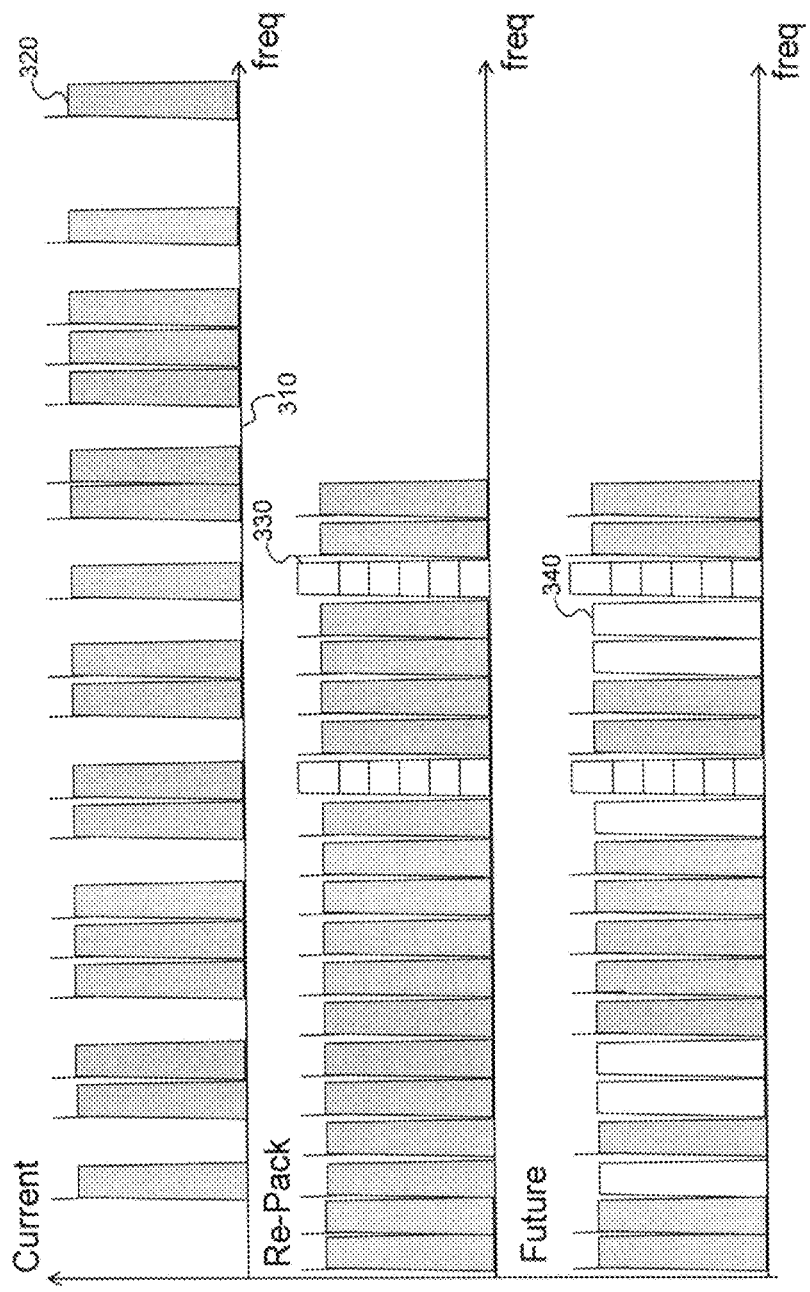
FIGS. 3A-3C illustrate examples of broadcast spectrum usage.
Figure 4:
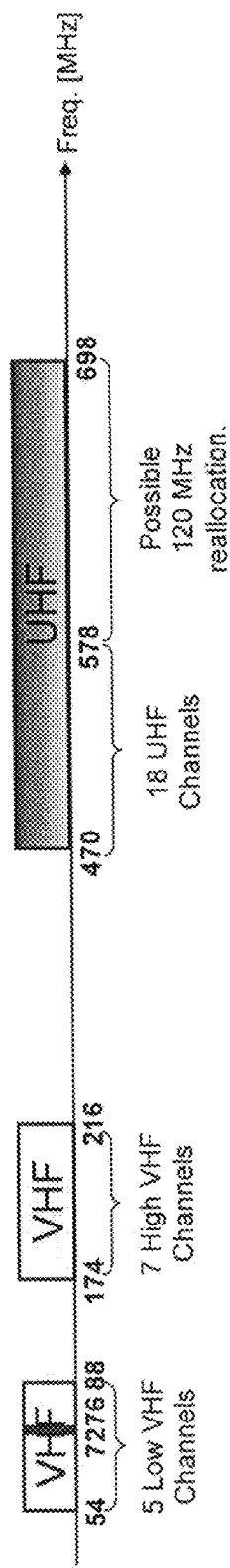
FIG. 4 illustrates an example of the broadcast spectrum.

FIGS. 3A-3C illustrate an example of broadcast spectrum usage when transitioning to a NGBT service. In one embodiment, the broadcast channels are consistent with the television broadcast channel allocation illustrated in FIG. 4. The broadcast channels may or may not occupy a portion of the broadcast spectrum between 578 MHz and 698 MHz based on whether the FCC reallocates that frequency band for other uses such as wireless broadband.

FIG. 3A illustrates an example of broadcast spectrum usage for existing digital television broadcast services according to ATSC A/53. The broadcast spectrum includes unused broadcast channels 310 and occupied broadcast channels 320. The FCC is expected to reallocate portions of the existing broadcast spectrum available for existing television broadcast services for other purposes, such as broadband services. After this allocation (or repack), in a worst case scenario, no unused broadcast channels would be available in crowded markets. Accordingly, in one embodiment, at least one broadcast channel is allocated as a transition broadcast channel 330. The at least one transition broadcast channel 330 may be assigned by a government entity such as the FCC or determined by the individual television broadcasters.

The at least one transition broadcast channel 330 may or may not have enough capacity to concurrently carry a first service from each of the broadcast providers in the same market. In one embodiment, each of the at least one broadcast channel 330 has sufficient capacity to carry six different first services. Depending on the embodiment, each of the six different first services are provided by a different broadcast provider or the same broadcast provider may provide two or more of the six different services. However, other numbers of services may be provided on the transition broadcast channel 330 based on bit rate requirements.

The at least one transition broadcast channel allows broadcast providers (e.g., broadcast providers 15a, 15b) to provide the plurality of first and second services, concurrently, until the broadcast providers switch their own broadcasts to the plurality of first services. In one embodiment, the broadcast providers include the same content in both the first and second services. In a further embodiment, the broadcast providers include higher resolution content in the plurality of first services.

FIG. 3C illustrates an example where some of the broadcast providers have switched their own broadcast channels to broadcasting the plurality of first services (e.g., broadcast channel 340). As broadcast providers transition to broadcasting the plurality of first services, transition broadcast channel space is freed up for use by other broadcast providers. If necessary, transition broadcast channel access by each broadcast provider may be prioritized based on a lottery, auction, business agreement between the various broadcast providers, etc.

Figure 5:
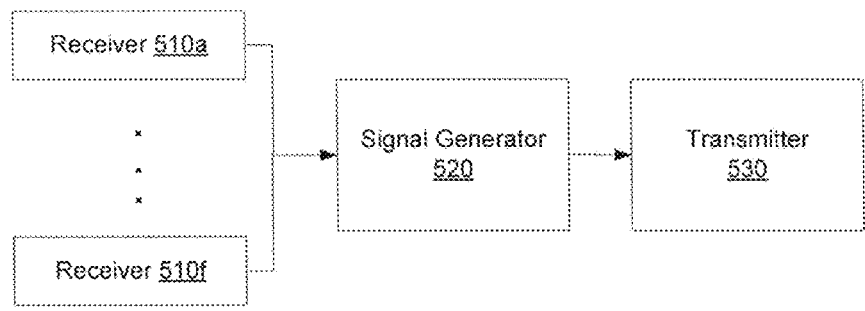
FIG. 5 illustrates an example of a distribution system.

FIG. 5 illustrates an example of a distribution system 500 used by the transition broadcast provider 10 to broadcast the plurality of first services in one embodiment. The distribution system 500 includes at least one receiver (e.g., receivers 510a-510f, one for each first service) to receive the plurality of first services to be provided by the distribution system 500. In other embodiments, one of the receivers 510a-510f may be configured to receive two or more of the first services from one or more of the broadcast providers.

The receivers 510a-510f receive the plurality of first services from at least two broadcast providers. In another embodiment, the receivers 510a-510f receive the plurality of first services from at least one broadcast provider. The receivers 510a-510f provide the received plurality of first services to a signal generator 520. The signal generator 520 generates a broadcast signal with the plurality of first services and provides the broadcast signal to a transmitter 530 for broadcast to the reception apparatus 20.

Figure 6:
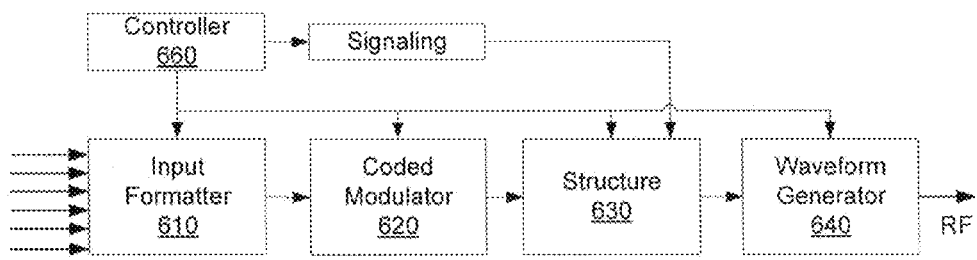
FIG. 6 illustrates an example of a signal generator.

In one embodiment, the signal generator 520 is an OFDM-based signal generator as illustrated in FIG. 6. As illustrated in FIG. 6, an input formatter 610 receives the plurality of first services from the receivers 510a-510f. The input formatter 610 formats the IP packets and/or transport streams associated with the plurality of received first services into packets of the same length for forward error correction (FEC). A coded modulator 620 modulates the signal and a structure 630 performs framing output and signaling. A waveform generator 640 subsequently performs an inverse fast fourier transfer (FFT) to generate the OFDM-based signal.

In one embodiment, a controller 660 controls the operation of each of the input formatter 610, coded modulator 620, structure 630, and waveform generator 640. Further, the controller 660 provides signaling information to the structure 630. The signaling information includes, for example, FFT size (e.g., 1024, 4096, 8192, 32768, etc.), frame structure (i.e., how much data is in the frame), FEC structure (e.g., Low-density parity-check (LDPC) coding structure), modulation setting (e.g., 1024QAM, 256QAM), etc. The controller 660 may be a dedicated controller for the signal generator 520 or implemented by a controller of the reception apparatus 20.

Figure 7:
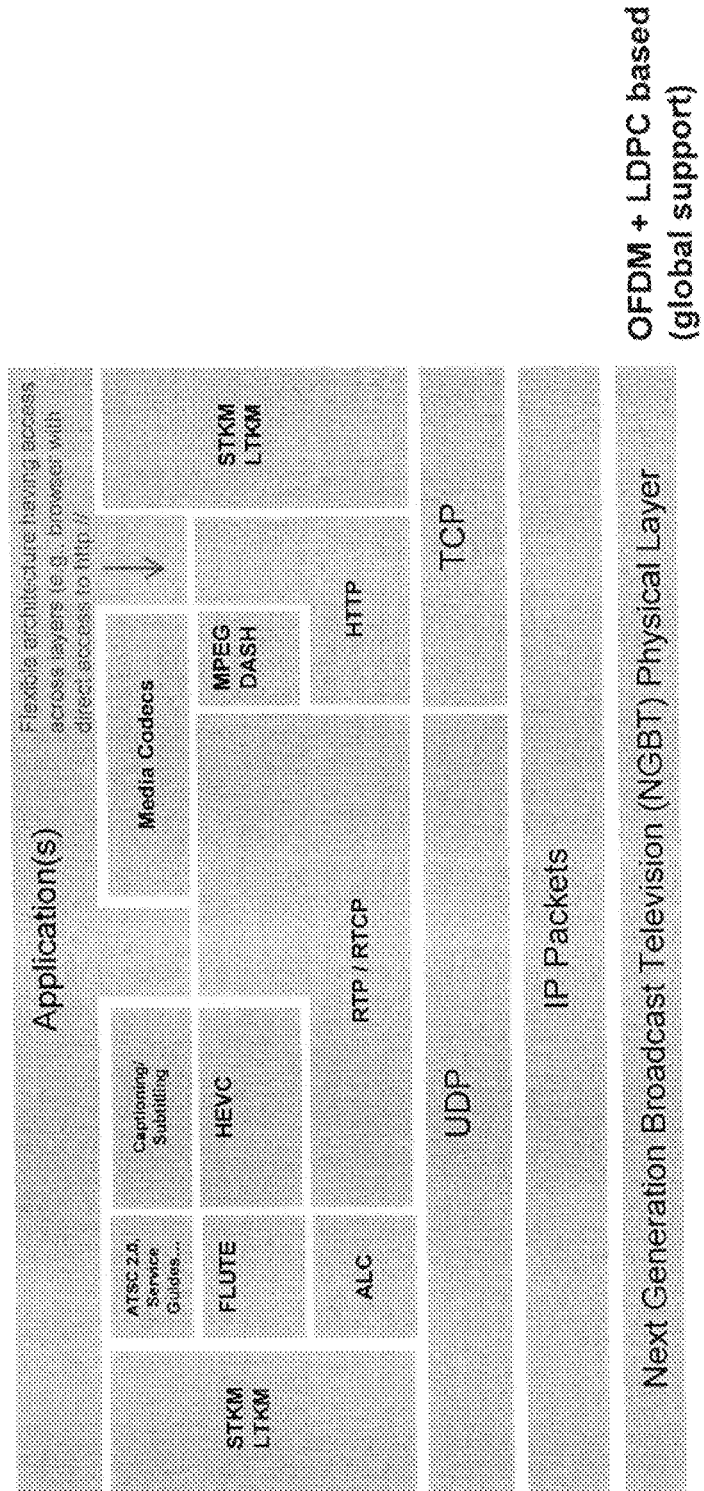
FIG. 7 illustrates an exemplary protocol stack.

FIG. 7 illustrates an exemplary protocol stack for NGBT. In one embodiment, the physical layer is implemented using OFDM and LDPC code. However, other encoding and/or error correction modes may be utilized. Applications of the protocol stack include a video presentation, a social media interface, interactivity, ATSC 2.0, etc. For example, in one embodiment, the protocol stack provides a social media interface to share content on Facebook that is being watched on the reception apparatus 20. Broadcast content is sent via the user datagram protocol (UDP), which sends data one-way (no hand-shaking), and the social media interface is provided through the transmission control protocol (TCP) for hand-shaking acknowledgement of sent data, for example using Moving Picture Experts Group (MPEG) Dynamic Adaptive Streaming over Hypertext Transfer Protocol (DASH). MPEG DASH allows for dynamic control of service (video and audio) bit rate, which allows a smooth video to be maintained when networks are congested.

As illustrated in FIG. 7, the protocol stack includes a file delivery unidirectional transport (FLUTE) as defined in RFC 392 for delivering files in a transport, which is incorporated herein by reference in its entirety. The protocol stack further includes short-term key messages (STKMs) and long-term key messages (LTKMs) used as keys for encrypted content, the real-time transport protocol (RTP) which provides real-time transport of data, the real-time transport control protocol (RTCP) which provides out-of-band statistics and control information for an RTP flow, asynchronous layered coding (ALC) which allows for asynchronous stuffing of data into a datagram (e.g., UDP), high efficiency video coding (HEVC) for video and/or audio coding. The hypertext transfer protocol (HTTP) is used mainly in Internet access; the ATSC 2.0/Service Guides are table listings of content; captioning/subtitling are text fragments describing video content; and media codecs are HEVC, object-oriented audio coding, etc. to be used in either broadcast or broadband connections. Application is the presentation of data to the display device.

Figure 8:
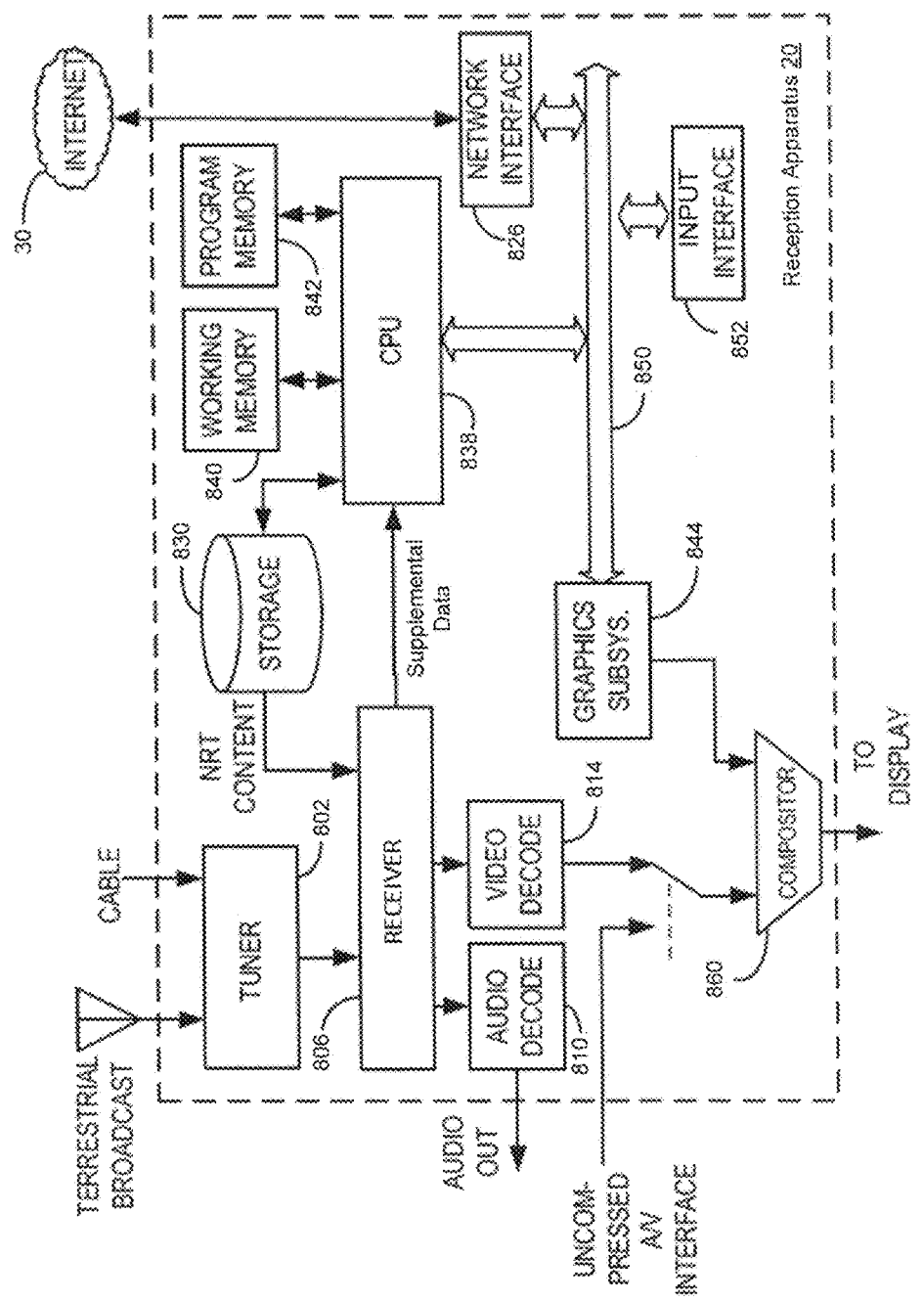
FIG. 8 is a block diagram of an exemplary reception apparatus.

FIG. 8 illustrates an embodiment of the reception apparatus 20. The reception apparatus 20 is, or is integrated or an add-on component to, a mobile device such as a cellular phone, tablet, smart phone, portable computer, etc. In other embodiments, the reception apparatus 20 is a fixed device such as a digital television receiver device that is incorporated into a television set, a set top box, or any other fixed device configured to receive television content.

The reception apparatus 20 includes a tuner 802, which is configured to tune to different broadcast channels and receive the plurality of first services broadcast by the transition broadcast provider 10 via a terrestrial broadcast. The reception apparatus 20 is optionally configured to tune to and receive the plurality of second services broadcast by the broadcast providers 15a, 15b.

In one embodiment, the tuner 802 provides a broadcast signal received over a currently tuned broadcast channel to a receiver 806. The receiver 806 extracts audio and video (A/V) streams from a selected one of the plurality of first services. In one embodiment, the receiver 806 is an OFDM-based receiver. However, the receiver 806 may be configured to process other signal types such as an NGBT signal or other broadcast signal of a type different from the signal broadcast by the broadcast providers 15a, 15b. The audio is decoded by an audio decoder 810 and the video is decoded by a video decoder 814. Further, uncompressed A/V data may be received via an uncompressed A/V interface (e.g., a HDMI interface). In one embodiment, the uncompressed A/V interface is only provided when the reception apparatus 20 is a fixed device.

The broadcast signal includes supplemental data such as one or a combination of closed caption data, EPG data, interactive content, ATSC 2.0 content, software applications, a social media interface, emergency services, accessibility data, etc. The supplemental data are separated out by the receiver 806. However, the supplemental data may be received via the Internet 30 and a network interface 826. The network interface 826 includes one or a combination of wired and wireless interfaces (e.g., an Ethernet interface, cellular data network interface, etc.) A storage unit 830 is provided to store non-real time or Internet-delivered content such as the supplemental data.

The reception apparatus 20 generally operates under control of at least one processor, such as CPU 838, which is coupled to a working memory 840, program memory 842, and a graphics subsystem 844 via one or more buses (e.g., bus 850). The CPU 838 receives closed caption data from the receiver 806 as well as any other supplemental data used for rendering graphics, and passes appropriate instructions and data to the graphics subsystem 844. The graphics outputted by the graphics subsystem 844 are combined with video images by the compositor and video interface 860 to produce an output suitable for display on a video display.

Further, the CPU 838 operates to carry out functions of the reception apparatus 20 including the processing of the supplemental data (e.g., interactivity, social media interfacing, etc.) and based on user inputs received from an input interface 852.

Although not illustrated in FIG. 8, the CPU 838 may be coupled to any one or a combination of the reception apparatus 20 resources to centralize control of one or more functions. In one embodiment, the CPU 838 also operates to oversee control of the reception apparatus 20 including the tuner 802 and other television resources.

Figure 9:
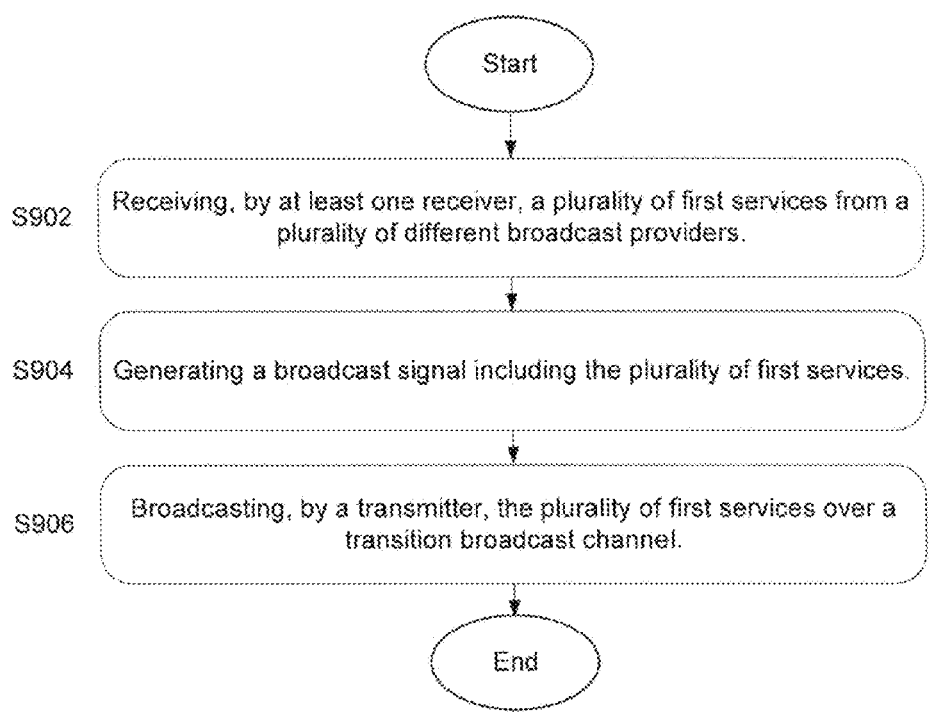
FIG. 9 illustrates a flow diagram of an exemplary broadcasting method.

FIG. 9 is a flow diagram of an exemplary broadcasting method. As illustrated in FIG. 9, at least one receiver in a distribution system of the transition broadcast provider 10 receives a plurality of first services from a plurality of different broadcast providers in step S902. The plurality of first services are provided to the transition broadcast provider 10 via any one or a combination of communication means such as microwave transmissions (e.g., satellite or terrestrial), the Internet, a dedicated wired connection, cable television, shipping storage media containing the first service, etc.

In step S904, a broadcast signal including the plurality of first services is generated by a signal generator in the distribution system. In step S906, a transmitter broadcasts the plurality of services over a transition broadcast channel.

Figure 10:
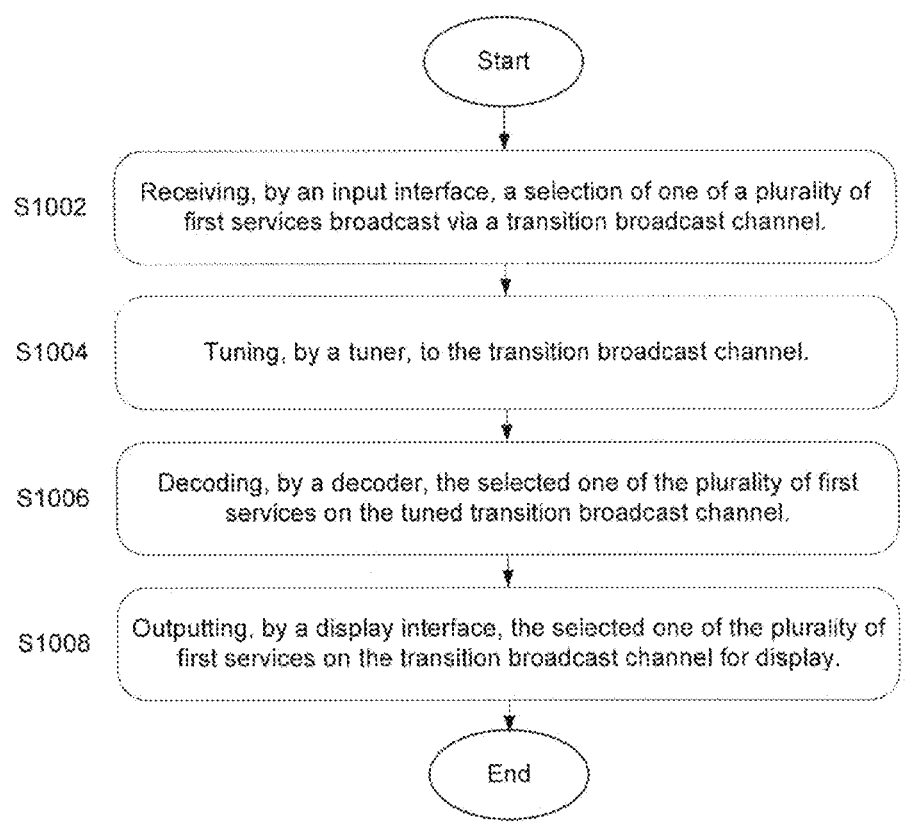
FIG. 10 illustrates a flow diagram of an exemplary reception method.

FIG. 10 is a flow diagram of an exemplary reception method. In step S1002, the reception apparatus 20 receives, via an input interface (e.g., a touch screen, remote control receiver, etc.) a selection of one of a plurality of first services broadcast via a transition broadcast channel. In step S1004, the reception apparatus 20 tunes to the transition broadcast channel. In step S1006, the reception apparatus 20 decodes the selected one of the plurality of first services on the tuned transition broadcast channel. In step S1008, the reception apparatus 20 outputs the selected one of the plurality of first services on the transition broadcast channel for display.

Figure 11:
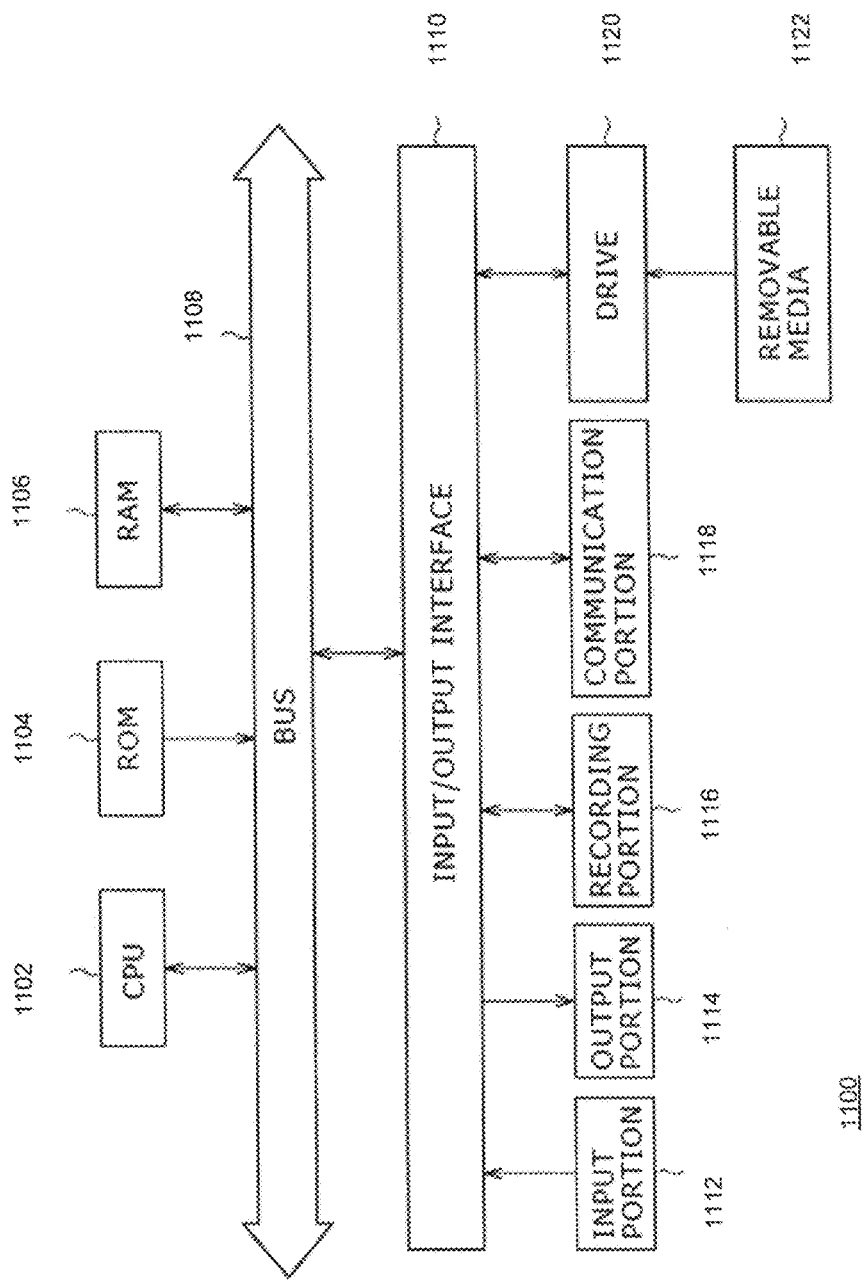
FIG. 11 is an exemplary computer.

FIG. 11 is a block diagram showing an example of a hardware configuration of a computer 1100 that can be configured to function as, or incorporate, any one or a combination of the distribution system for the transition broadcast provider 10; distribution system for the broadcast providers 15*a*, 15*b*; reception apparatus 20; and server 40.

As illustrated in FIG. 11, the computer 1100 includes a central processing unit (CPU) 1102, read only memory (ROM) 1104, and a random access memory (RAM) 1106 interconnected to each other via one or more buses 1108. The one or more buses 1108 are further connected with an input-output interface 1110. The input-output interface 1110 is connected with an input portion 1112 formed by a keyboard, a mouse, a microphone, remote controller, etc. The input-output interface 1110 is also connected to an output portion 1114 formed by an audio interface, video interface, display, speaker, etc.; a recording portion 1116 formed by a hard disk, a non-volatile memory, etc.; a communication portion 1118 formed by a network interface, modem, USB interface, fire wire interface, etc.; and a drive 1120 for driving removable media 1122 such as a magnetic disk, an optical disk, a magneto-optical disk, a semiconductor memory, etc.

According to one embodiment, the CPU 1102 loads a program stored in the recording portion 1116 into the RAM 1106 via the input-output interface 1110 and the bus 1108, and then executes a program configured to provide the functionality of the one or combination of the distribution system for the transition broadcast provider 10; distribution system for the broadcast providers 15*a*, 15*b*; reception apparatus 20; and server 40.

Although embodiments of the present disclosure are discussed with respect to transitioning services for terrestrial broadcast channels, more particularly television broadcast channels, use of a transition channel is equally applicable to radio station broadcasts (e.g., when transitioning to a new service that includes picture content), satellite broadcasts, and any other communication method in which transmission capacity is limited.

The various processes discussed above need not be processed chronologically and/or in the sequence depicted as flowcharts; the steps may also include those processed in parallel or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present disclosure are possible in light of the above teachings. It is therefore to be understood that within the scope of the appended claims, the present disclosure may be practiced otherwise than as specifically described herein.

The above disclosure also encompasses the embodiments noted below.

(1) A distribution system configured to broadcast a plurality of first services from a plurality of different broadcast providers, which broadcast a plurality of second services over a plurality of different broadcast channels, on a transition broadcast channel that is different from the plurality of different broadcast channels, the system including at least one receiver configured to receive the plurality of first services from the plurality of different broadcast providers; and a transmitter configured to broadcast the plurality of first services over the transition broadcast channel.

(2) The distribution system of feature (1), further including a signal generator configured to generate an orthogonal frequency-division multiplexing (OFDM)-based signal including the plurality of first services from the plurality of different broadcast providers, in which the transmitter is configured to broadcast the OFDM-based signal.

(3) The distribution system of feature (1) or (2), in which the plurality of first and second services include television programs, and the transmitter is configured to broadcast at least one television program that is the same as a television program broadcast by one of the plurality of different broadcast providers.

(4) The distribution system of feature (3), in which the resolution of the television program broadcast by the transmitter is greater than the resolution of the television program broadcast by the one of the plurality of different broadcast providers.

(5) The distribution system of any of features (1) to (4), in which the transition broadcast channel is a multiple of a 6 MHz channel within a range of 470 MHz to 698 MHz.

(6) The distribution system of any of features (1) to (5), in which the transition broadcast channel is a multiple of a 6 MHz channel within a range of 470 MHz to 578 MHz.

(7) The distribution system of any of features (1) to (6), in which the transition broadcast channel is a 6 MHz channel that includes first services from six different digital television broadcast providers.

(8) The distribution system of any of features (1) to (7), in which the transition broadcast channel is a 6 MHz channel from 578 to 584 MHz or 698 to 704 MHz.

(9) The distribution system of any of features (1) to (8), in which the transition broadcast channel is a predetermined television channel that is specified by a contractual agreement between the plurality different broadcast providers.

(10) The distribution system of any of features (1) to (9), in which the transition broadcast channel is a predetermined television channel that is specified by the Federal Communications Commission (FCC) as a transition broadcast channel to be shared between the plurality of different broadcast providers.

(11) The distribution system of any of features (1) to (10), in which the plurality of different broadcast providers are digital television broadcast providers that broadcast the digital television content over the plurality of different television channels using an 8-level vestigial sideband modulation (8-VSB) modulation method, and the transmitter is configured to broadcast the plurality of first services over the transition broadcast channel using a modulation method different from the 8-VSB modulation method.

(12) A reception apparatus configured to receive a plurality of first services from a plurality of different broadcast providers, which broadcast a plurality of second services over a plurality of different broadcast channels, on a transition broadcast channel that is different from the plurality of different broadcast channels, the reception apparatus including an input interface configured to receive a selection of one of the plurality of first services broadcast via the transition broadcast channel; a tuner configured to tune to the transition broadcast channel; a decoder configured to decode the selected one of the plurality of first services on the tuned transition broadcast channel; and a display interface configured to output the selected one of the plurality of first services on the transition broadcast channel for display.

(13) The reception apparatus of feature (12), in which the reception apparatus is a mobile device.

(14) The reception apparatus of feature (12) or (13), in which the reception apparatus is a cellular phone, a tablet, a portable computer, or a smart phone.

(15) The reception apparatus of any of features (12) to (14), further including an orthogonal frequency division multiplexing (OFDM)-based decoder configured to decode an OFDM-based signal including the plurality of first services and carried on the transition broadcast channel.

(16) The reception apparatus of any of features (12) to (15), further including a communication interface configured to access a computer network based on information included in the selected one of the at least one of the plurality of first services.

(17) The reception apparatus of any of features (12) to (16), in which the plurality of first and second services include television programs, and the tuner is configured to receive a television program that is the same as a television program broadcast by one of a plurality of different digital television broadcast providers.

(18) The reception apparatus of feature (17), in which the resolution of the television program broadcast by the transmitter is greater than the resolution of the television program broadcast by the one of the plurality of different digital television broadcast providers.

(19) The reception apparatus of any of features (12) to (18), in which the transition broadcast channel is a multiple of a 6 MHz channel within a range of 470 MHz to 698 MHz.

(20) The reception apparatus of any of features (12) to (19), in which the transition broadcast channel is a multiple of a 6 MHz channel within a range of 470 MHz to 578 MHz.

(21) The reception apparatus of any of features (12) to (20), in which the transition broadcast channel is a 6 MHz channel that includes the plurality of first services from six different digital television broadcast providers.

(22) The reception apparatus of any of features (12) to (21), in which the transition broadcast channel is a 6 MHz channel from 578 to 584 MHz or 698 to 704 MHz.

(23) The reception apparatus of any of features (12) to (22), in which the transition broadcast channel is a predetermined television channel that is specified by a contractual agreement between the plurality different broadcast providers.

(24) The reception apparatus of any of features (12) to (23), in which the transition broadcast channel is a predetermined television channel that is specified by the Federal Communications Commission (FCC) as a transition broadcast channel to be shared between the plurality of different broadcast providers.

(25) The reception apparatus of any of features (12) to (24), in which the plurality of different broadcast providers are digital television broadcast providers that broadcast the digital television content over the plurality of different television channels using an 8-level vestigial sideband modulation (8-VSB) modulation method, and the tuner is configured to receive the plurality of first services broadcast over the transition broadcast channel using a modulation method different from the 8-VSB modulation method.

(26) A method of a distribution system configured to broadcast a plurality of first services from a plurality of different broadcast providers, which broadcast a plurality of second services over a plurality of different broadcast channels, on a transition broadcast channel that is different from the plurality of different broadcast channels, the method including receiving, by at least one receiver, the plurality of first services from the plurality of different broadcast providers; and broadcasting, by a transmitter, the plurality of first services over the transition broadcast channel.

(27) A method of a reception apparatus configured to receive a plurality of first services from a plurality of different broadcast providers, which broadcast a plurality of second services over a plurality of different broadcast channels, on a transition broadcast channel that is different from the plurality of different broadcast channels, the method including receiving, by an input interface, a selection of one of the plurality of first services broadcast via the transition broadcast channel; tuning, by a tuner, to the transition broadcast channel; decoding, by a decoder, the selected one of the plurality of first services on the tuned transition broadcast channel; and outputting, by a display interface, the selected one of the plurality of first services on the transition broadcast channel for display.

The invention claimed is:

1. A distribution system, comprising:
at least one receiver configured to receive a plurality of first services from a plurality of different broadcast providers, which broadcast a plurality of second services over a plurality of different broadcast channels; and
a transmitter configured to broadcast the received plurality of first services over a same transition broadcast channel that is different from the plurality of different broadcast channels, wherein
the plurality of different broadcast channels and the transition broadcast channel occupy different portions of a same wireless spectrum.

2. The distribution system according to claim 1, further comprising:
a signal generator configured to generate an orthogonal frequency-division multiplexing (OFDM)-based signal including the plurality of first services from the plurality of different broadcast providers, wherein
the transmitter is configured to broadcast the OFDM-based signal.

3. The distribution system according to claim 1, wherein
the plurality of first and second services include television programs, and
the transmitter is configured to broadcast at least one television program that is the same as a television program broadcast by one of the plurality of different broadcast providers.

4. The distribution system according to claim 3, wherein
the resolution of the television program broadcast by the transmitter is greater than the resolution of the television program broadcast by the one of the plurality of different broadcast providers.

5. The distribution system according to claim 1, wherein the transition broadcast channel is a multiple of a 6 MHz channel within a range of 470 MHz to 698 MHz.

6. The distribution system according to claim 1, wherein the transition broadcast channel is a multiple of a 6 MHz channel within a range of 470 MHz to 578 MHz.

7. The distribution system according to claim 1, wherein the transition broadcast channel is a 6 MHz channel that includes first services from six different digital television broadcast providers.

8. The distribution system according to claim 1, wherein the transition broadcast channel is a 6 MHz channel from 578 to 584 MHz or 698 to 704 MHz.

9. The distribution system according to claim 1, wherein the transition broadcast channel is a predetermined television channel that is specified by a contractual agreement between the plurality different broadcast providers.

10. The distribution system according to claim 1, wherein the transition broadcast channel is a predetermined television channel that is specified by the Federal Communications Commission (FCC) as a transition broadcast channel to be shared between the plurality of different broadcast providers.

11. The distribution system according to claim 1, wherein
the plurality of different broadcast providers are different digital television broadcast providers that broadcast digital television content over a plurality of different broadcast channels using an 8-level vestigial sideband modulation (8-VSB) modulation method, and
the transmitter is configured to broadcast the plurality of first services over the transition broadcast channel using a modulation method different from the 8-VSB modulation method.

12. The distribution system according to claim 1, wherein the wireless spectrum is a range of terrestrial broadcast frequencies.

13. A reception apparatus, comprising:
circuitry configured to
receive a plurality of first services from a plurality of different broadcast providers, which broadcast a plurality of second services over a plurality of different broadcast channels, on a same transition broadcast channel that is different from the plurality of different broadcast channels;
receive a selection of one of the plurality of first services broadcast via the transition broadcast channel;
tune to the transition broadcast channel;
decode the selected one of the plurality of first services on the tuned transition broadcast channel; and
output the selected one of the plurality of first services on the transition broadcast channel for display, wherein
the plurality of different broadcast channels and the transition broadcast channel occupy different portions of a same wireless spectrum.

14. The reception apparatus according to claim 13, wherein the reception apparatus is a mobile device.

15. The reception apparatus according to claim 13, wherein the reception apparatus is a cellular phone, a tablet, a portable computer, or a smart phone.

16. The reception apparatus according to claim 13, further comprising:
an orthogonal frequency division multiplexing (OFDM)-based decoder configured to decode an OFDM-based signal including the plurality of first services and carried on the transition broadcast channel.

17. The reception apparatus according to claim 13, further comprising:
a communication interface configured to access a computer network based on information included in the selected one of the at least one of the plurality of first services.

18. The reception apparatus according to claim 13, wherein
the plurality of first and second services include television programs, and
the tuner is configured to receive a television program that is the same as a television program broadcast by one of a plurality of different digital television broadcast providers.

19. The reception apparatus according to claim 18, wherein
the resolution of the television program broadcast by the transmitter is greater than the resolution of the television program broadcast by the one of the plurality of different digital television broadcast providers.

20. The reception apparatus according to claim 13, wherein the transition broadcast channel is a multiple of a 6 MHz channel within a range of 470 MHz to 698 MHz.

21. The reception apparatus according to claim 13, wherein the transition broadcast channel is a multiple of a 6 MHz channel within a range of 470 MHz to 578 MHz.

22. The reception apparatus according to claim 13, wherein the transition broadcast channel is a 6 MHz channel that includes the plurality of first services from six different digital television broadcast providers.

23. The reception apparatus according to claim 13, wherein the transition broadcast channel is a 6 MHz channel from 578 to 584 MHz or 698 to 704 MHz.

24. The reception apparatus according to claim 13, wherein the transition broadcast channel is a predetermined television channel that is specified by a contractual agreement between the plurality different broadcast providers.

25. The reception apparatus according to claim 13, wherein the transition broadcast channel is a predetermined television channel that is specified by the Federal Communications Commission (FCC) as a transition broadcast channel to be shared between the plurality of different broadcast providers.

26. The reception apparatus according to claim 13, wherein
the plurality of different broadcast providers are digital television broadcast providers that broadcast digital television content over a plurality of different television channels using an 8-level vestigial sideband modulation (8-VSB) modulation method, and
the circuitry is configured to receive the plurality of first services broadcast over the transition broadcast channel using a modulation method different from the 8-VSB modulation method.

27. A method of a distribution system, the method comprising:
receiving, by at least one receiver of the distribution system, a plurality of first services from a plurality of different broadcast providers, which broadcast a plurality of second services over a plurality of different broadcast channels; and
broadcasting, by a transmitter of the distribution system, the received plurality of first services over a same transition broadcast channel that is different from the plurality of different broadcast channels, wherein
the plurality of different broadcast channels and the transition broadcast channel occupy different portions of a same wireless spectrum.

28. A method of a reception apparatus, the method comprising:
receiving, by an input interface of the reception apparatus, a selection of one of a plurality of first services from a plurality of different broadcast providers broadcast, via a same transition broadcast channel, wherein the plurality of different broadcast providers broadcast a plurality of second services over a plurality of different broadcast channels;
tuning, by a tuner of the reception apparatus, to the transition broadcast channel, the transition broadcast channel being different from the plurality of different broadcast channels;
decoding, by a decoder of the reception apparatus, the selected one of the plurality of first services on the tuned transition broadcast channel; and
outputting, by a display interface of the reception apparatus, the selected one of the plurality of first services on the transition broadcast channel for display, wherein
the plurality of different broadcast channels and the transition broadcast channel occupy different portions of a same wireless spectrum.

* * * * *